United States Patent [19]

Nakai

[11] 4,320,944
[45] Mar. 23, 1982

[54] PROGRAMMABLE EXPOSURE CONTROL SYSTEMS FOR A CAMERA

[75] Inventor: Masaaki Nakai, Nara, Japan

[73] Assignee: Minolta Camera Kabushiki Kaisha, Osaka, Japan

[21] Appl. No.: 29,919

[22] Filed: Apr. 13, 1979

[30] Foreign Application Priority Data

Apr. 18, 1978 [JP] Japan .................................. 53-46331

[51] Int. Cl.³ ............................................... G03B 7/08
[52] U.S. Cl. ................... 354/23 D; 354/50; 354/60 R
[58] Field of Search ................ 354/38, 36, 29, 30, 354/60 R, 289, 47, 53, 23 D, 60 A, 50, 51, 23 R, 43, 44

[56] References Cited

U.S. PATENT DOCUMENTS 4,103,307 7/1978 Shinoda et al. ................... 354/23 D

FOREIGN PATENT DOCUMENTS 52-33726 3/1977 Japan .
52-46815 4/1977 Japan .

Primary Examiner—L. T. Hix
Assistant Examiner—W. J. Brady
Attorney, Agent, or Firm—Watson, Cole, Grindle & Watson

[57] ABSTRACT

In a programmed exposure control system a signal indicative of the aperture value or the time value is automatically produced in accordance with a programmed relationship with a signal including information of the light measurement of an object. The former signal is optionally stored and either the aperture size or the exposure time is determined in accordance with the latter signal and the stored signal. The other of the aperture size or the exposure time is determined commensurate with the previously determined aperture size or exposure time.

Both the aperture size and exposure time are adapted to be automatically controlled according to a predetermined program in response to light measurement. An aperture value signal and a time value signal are produced according to light measurement in a programmed relationship. Alternatively, a signal indicative of either the aperture value or time value according to the light measurement may be produced and the other of either the aperture value or the time value may be determined in accordance with the produced signal and the light measurement. The aperture value or the time value may be optionally stored and the non-stored value may be determined from the stored value and the light measurement information. At least either one of the aperture value or the time value may be optionally changed to provide a pre-selection of the values in either the aperture-priority or time-priority exposure modes.

18 Claims, 14 Drawing Figures

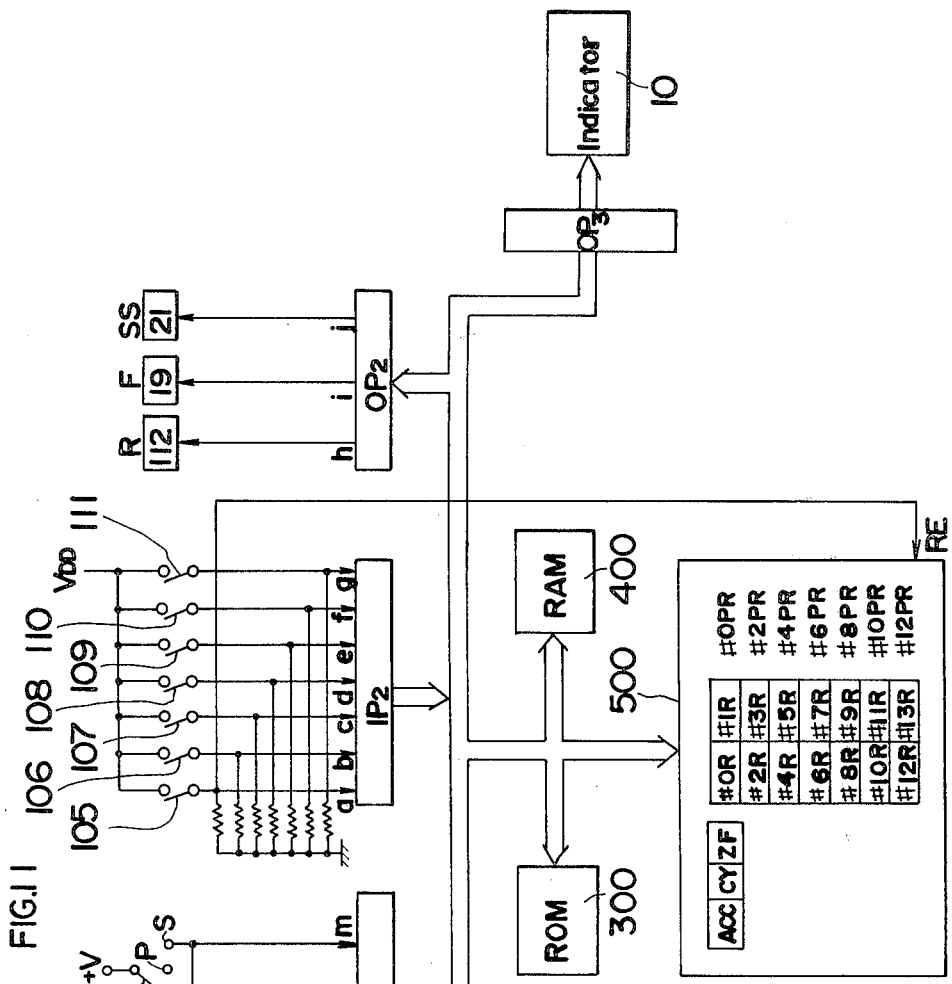
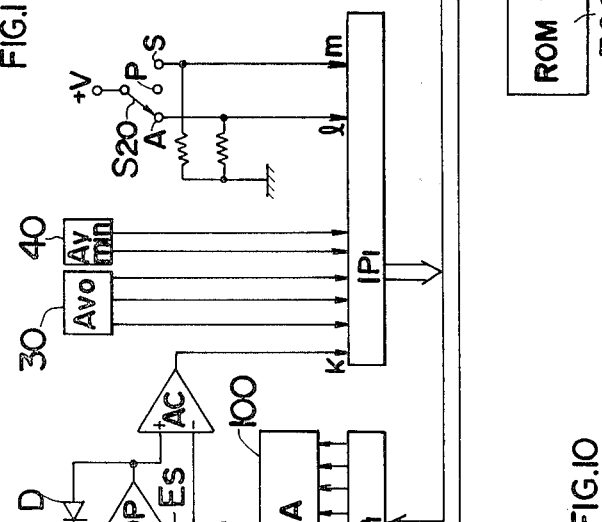
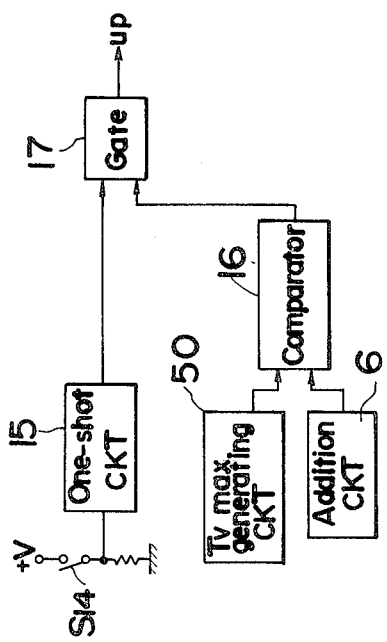

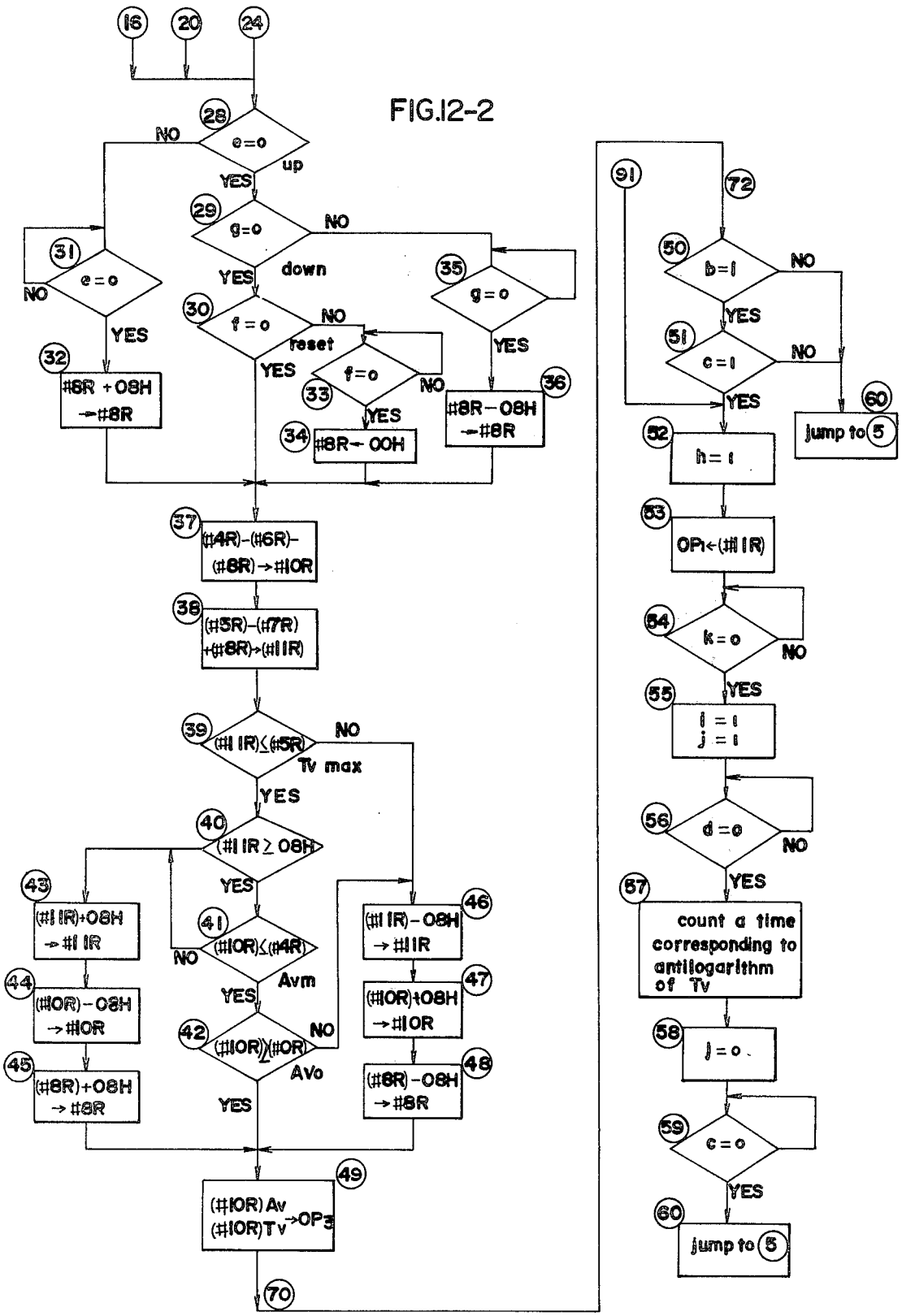

PROGRAMMABLE EXPOSURE CONTROL SYSTEMS FOR A CAMERA

BACKGROUND OF THE INVENTION

1 Field of the Invention

The present invention generally relates to exposure control systems for cameras, and more particularly to exposure control systems capable of programmed exposure control.

2. Description of the Prior Art

In the prior art, it is known to automatically control both the aperture size and exposure time of a camera according to the light measurement in a programmed manner, such as disclosed in U.S. Pat. No. 4,103,307 or Japanese patent application laid open to the public under No. 52-46815.

Such cameras are generally provided with a diaphragm preset ring or shutter speed dial for use in manual setting of the aperture value or exposure time in the respective cases of aperture-priority or time-priority automatic exposure control.

SUMMARY OF THE INVENTION

An object of the present invention is to provide a simplified exposure control system capable of programmed automatic exposure control, aperture-priority automatic exposure control and time-priority automatic exposure control.

Another object of the present invention is to provide a programmed automatic exposure control system capable of aperture-priority or time-priority automatic exposure control without the aid of a diaphragm preset ring or shutter speed dial.

A further object of the present invention is to provide an exposure control system of a camera in which a shutter speed dial or the like is not necessary.

According to the present invention, both the aperture size and exposure time are basically adapted to be automatically controlled according to a predetermined program in response to the light measurement. This programmed automatic exposure control may be achieved by means of producing an aperture value signal and time value signal according to light measurement in a programmed relationship. Or, alternatively, the programmed automatic exposure control may be achieved by means of producing a signal indicative of either the aperture value or time value according to the light measurement and by means of determining the other of either the aperture value or time value in accordance with the produced signal and the light measurement.

The exposure control system of the present invention is further provided with means for optionally storing at least either the aperture value or time value produced by the producing means to optionally fix at least the aperture value or time value. For example, the aperture value is stored and fixed and the time value is automatically determined from the stored aperture value and the light measurement information. Thus, aperture-priority automatic exposure control with respect to the fixed aperture value is achieved in this case. In case that the time value is stored and fixed, it is apparent that time-priority automatic exposure control is similarly achieved.

According to another feature of the present invention, the exposure control system is provided with means for optionally changing at least either one of the aperture value or time value produced by the producing means. This enables a free selection of the value to which the priority is given in the aperture-priority or time-priority exposure mode.

As is apparent from the above discussion, the present invention generally improves a programmed automatic exposure control system so as to enable aperture-priority or time-priority exposure by means of optionally deviating from the predetermined program. Therefore, the aperture preset ring or shutter speed dial for setting the value to which the priority is given is no longer necessary.

BRIEF DESCRIPTION OF THE DRAWINGS

FIG. 10 represents a modification of the circuit in FIG. 4;

FIG. 11 represents a block diagram of a third embodiment of the present invention utilizing a micro-computer which achieves an equivalent function to that in the second embodiment in FIG. 6; and FIGS. 12-1, 12-2 and 12-3 represent flow charts showing the function of the third embodiment in FIG. 11.

DETAILED DESCRIPTION OF THE PREFERRED EMBODIMENTS

Figure 1:
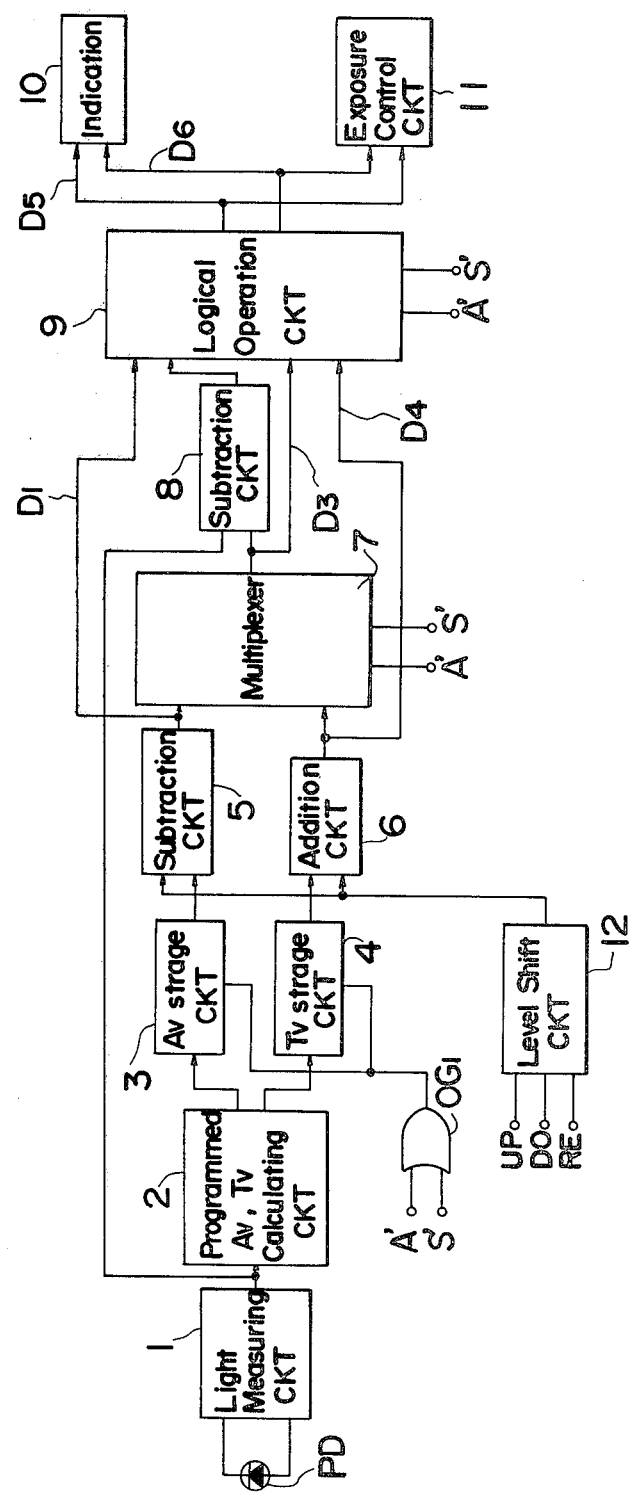
FIG. 1 represents a block diagram of a first embodiment of the present invention.
Figure 2:
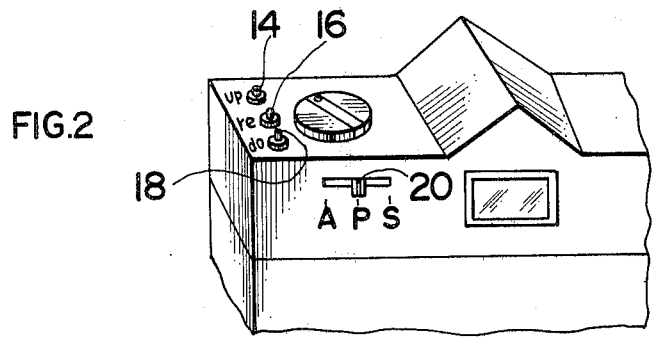
FIG. 2 represents a perspective view of a camera to which the present invention is applied.

FIG. 1 is a block diagram of one embodiment of the present invention, and FIG. 2 is a perspective rear view of a camera associating the present embodiment. Shown in FIG. 2 are "up", "down" and "reset" selector button switches 14, 16 and 18, respectively, and mode changeover switch 20. When mode changeover switch 20 is positioned at P in the center, exposure control in a programmed mode is possible. With switch 20 set to S or A, exposure control in an S mode, i.e. diaphragm priority mode or an A mode, i.e. exposure time priority mode is effected, respectively. Both A and S modes require setting of priority exposure information, i.e. aperture value in case of the A mode or time value in case of the S mode, which is performed by up button 14 or down button 18. Taking the S mode for diaphragm priority, for example, the function will now be briefly explained. With power first supplied to a camera, a combined set of the diaphragm aperture value and exposure time through a programmed system is indicated as an initial value on indicating device 10 in FIG. 1, and the diaphragm aperture value indicated at this time is set and fixed to the camera as a priority diaphragm aperture value. When the camera is then aimed at an object, the indication of exposure time alone changes in accordance with the variations of scene brightness. Assuming that the priority diaphragm aperture value is required to change to another value, pressing up button 14 once causes the priority diaphragm aperture value to be shifted by 1 Ev toward the fully open value, while pressing down button 18 once causes the priority diaphragm aperture to be shifted by 1 Ev toward the fully stopped-down value. Similarly in the A mode, each depression of up button 14 causes the priority exposure time value to be shifted by 1 Ev toward shorter exposure time and each depression of down button 18 causes the priority value to be shifted by 1 Ev toward longer exposure time. Upon depression of reset button 16, the priority diaphragm aperture or exposure time is reset to the originally programmed values.

Thus, the troublesome rotation of a conventional diaphragm ring or exposure time control dial is completely eliminated, and automatic exposure control is possible for the diaphragm aperture priority or exposure time priority mode by very simple operation.

The following is an explanation of the construction and operation shown in FIG. 1. Included in FIG. 1 are light receiving element PD, light measuring circuit 1, programmed Av, Tv calculating circuit 2 for producing a pair or signals commensurate with diaphragm aperture and exposure time for correct exposure based on an output from light measuring circuit 1, storage circuit 3 for storing a signal commensurate with the diaphragm aperture from program operational circuit 2 to fix the signal and storage circuit 4 for similarly storing and fixing a signal commensurate with the exposure time. Terminal A' in FIG. 1 receives a "high" signal as an input in the A mode or a "low" signal in the programmed mode, while terminal S' receives a "high" signal as an input in the S mode or a "low" signal in the programmed mode. With terminal A' or S' at a "high" level with the camera set to the A mode or S mode, and the output of OR circuit OG1 is at a "high" level, the memory contents stored at this time in storage circuits 3 and 4 are fixed and retained while the output of OR circuit OG1 remains at high level. Subtraction circuit 5 and addition circuit 6 operate to respectively perform subtraction and addition between a signal from level shift circuit 12 and signals from storage circuits 3 and 4, respectively. Produced from level shift circuit 12 are a +1 Ev signal when up button 14 in FIG. 2 is pressed once, and a −1 Ev signal when down button in FIG. 2 is pressed once. Furthermore, when reset button 16 in FIG. 2 is depressed, no shift signal is produced from level shift circuit 12. When terminal A' is at a "high" level, a signal commensurate with the exposure time from addition circuit 6 is produced from multiplexer 7, and when terminal S' is at a "high" level, a signal commensurate with the diaphragm aperture from subtraction circuit 5 is produced from multiplexer 7. When terminals A' and S' are both at "low" levels in the programmed mode, no signal is produced from multiplexer 7. Subtraction circuit 8 subtracts a signal of multiplexer 7 from a signal of light measuring circuit 1. In other words, subtraction circuit 8 produces a signal commensurate with the exposure time when a signal from multiplexer 7 is commensurate with the diaphragm aperture, while producing a signal commensurate with the diaphragm aperture when a signal from multiplexer 7 is commensurate with the exposure time. Logical operation circuit 9 produces at signal line D5 in the A mode a signal D2 commensurate with the diaphragm aperture value from subtraction circuit 8, while at signal line D6 is a signal D3 commensurate with the exposure time from multiplexer 7. In the S mode, produced at signal line D5 is a signal commensurate with the diaphragm aperture value from multiplexer 7, and at signal line D6 is a signal D2 commensurate with the exposure time from subtraction circuit 8, respectively. Further, in the programmed mode, produced at signal line D5 is a signal D1 from subtraction circuit 5, while at signal line D6 is a signal D4 from addition circuit 6. Indicating circuit 10 carries out indications based on a signal commensurate with the diaphragm aperture from signal line D5 and a signal commensurate with the exposure time from signal line D6. Also, exposure control circuit 11 controls the exposure time and diaphragm aperture in accordance with signals from signal lines D5 and D6, respectively.

Figure 3:
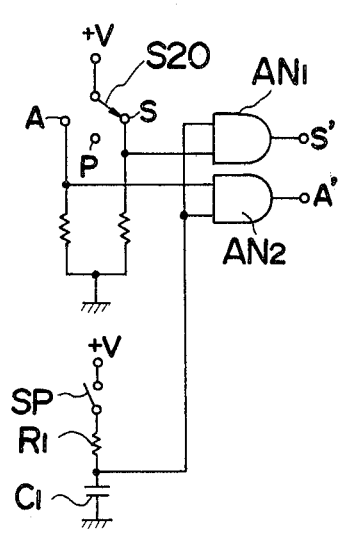
FIG. 3 represents a circuit diagram supplementary to FIGS. 1 and 6.

FIG. 3 is a circuit for producing a setting mode signal S' or A' required in the FIG. 1 embodiment or in the FIG. 6 embodiment hereinafter described. In the FIG. 3 circuit, even when switch SP in association with power-on operation is closed, AND gates AN1 and AN2 are not opened for a predetermined period of time through a delay circuit comprising resistor R1 and capacitor C1, and signals commensurate with the programmed mode are produced from output terminals A' and S' for the predetermined period of time. If this predetermined period of time is made longer than the time required for light measurement and indication to be performed, some data from programmed Av, Tv calculating circuit 2 can be input to storage circuits 3 and 4 without fail even with A mode or S mode set prior to the closure of switch SP.

Figure 4:
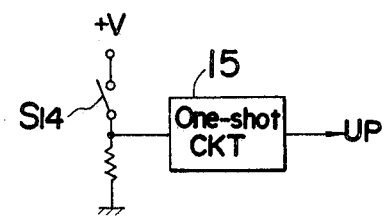
FIG. 4 represents another circuit diagram supplementary to FIGS. 1 and 6.
Figure 6:
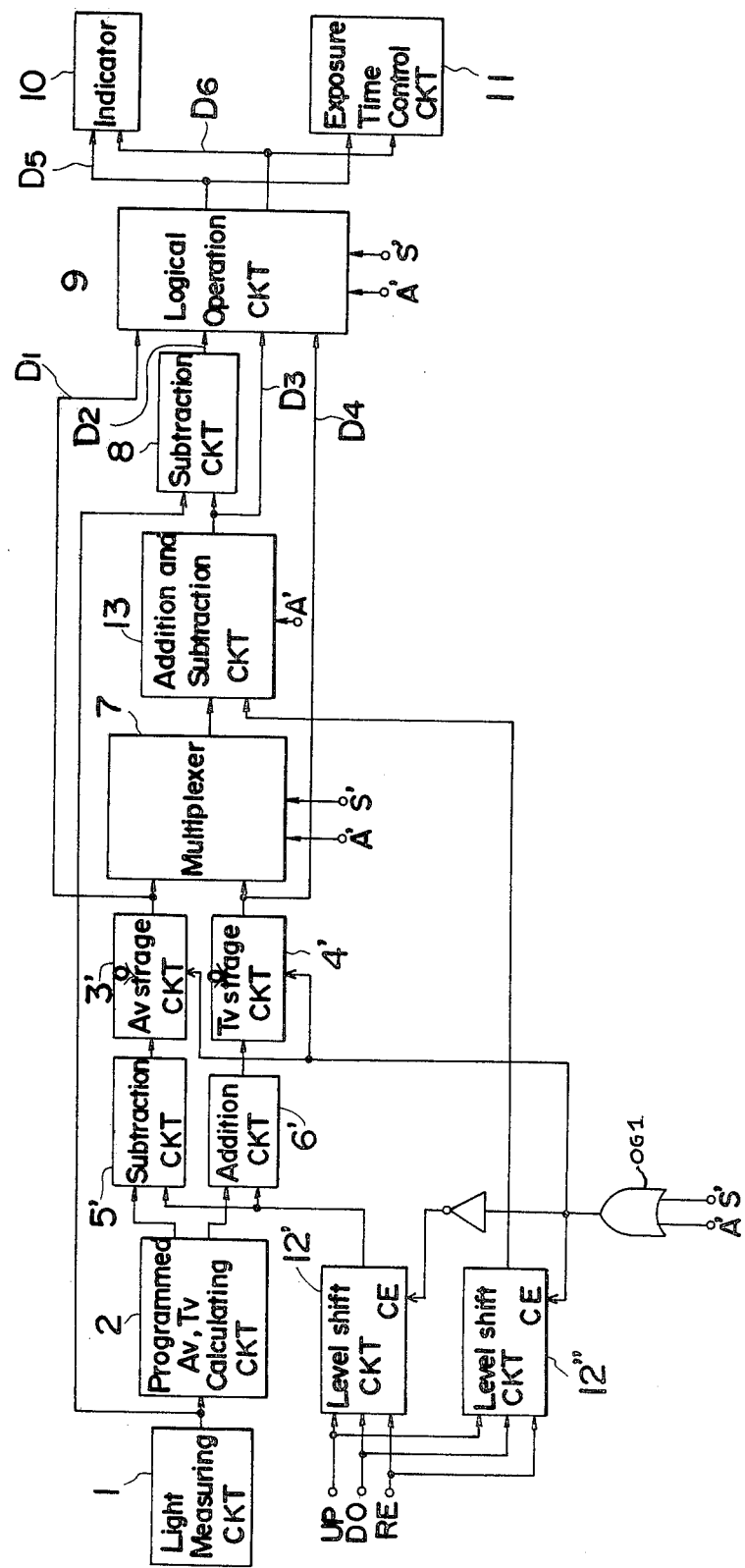
FIG. 6 represents a block diagram of a second embodiment of the present invention.

FIG. 4 is an example of a circuit which permits an input of an "up" signal to level shift circuit 12 in FIGS. 1 or 6. Switch S14 is closed on depression of up button 14. With switch S14 closed, one-shot circuit 15 is triggered, and the output thereof is a signal changed from a "low" to "high" level and after a given lapse of time from a "high" to "low" level, by which level shift circuit 12 which is a counter, counts up by 1. DO input and RE input circuits required by level shift circuit 12 can be both achieved by a circuit of a similar construction as in FIG. 4.

Figure 5:
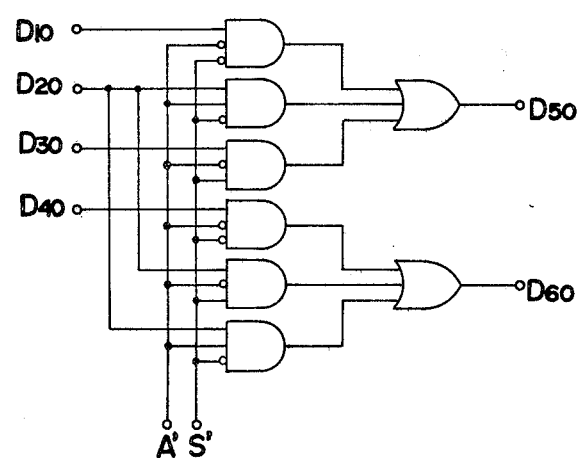
FIG. 5 represents a circuit diagram showing the details of block 9 in FIGS. 1 and 6.

FIG. 5 is an example of a portion of the circuit for 1 bit portion of the logical operation circuit 9 in FIG. 1 or 6, and in case that the circuit 9 is of 8 bits, for example, eight circuits of a similar construction as in FIG. 5 may be provided. Light measuring circuit 1 is a known light measuring circuit combined with a known A-D converter. Furthermore, a storage circuit can be constructed with known registers, and subtraction circuits 5 and 8, addition circuit 6, multiplexer 7, indicating circuit 10 and exposure control circuit 11 are all of well-known types.

FIG. 6 is a block diagram of another embodiment of the present invention. Components identical to those in FIG. 1 represent the same symbols and characters. The difference from FIG. 1 is that there are two level shift circuits 12' and 12", each of which is a counter. Level shift circuit 12' changes the combination in the programmed mode. In other words, the enable terminal CE of counter 12' becomes "high" with both terminals A' and S' of OR gate OG1 being "low", to enable the count, whereby the output of programmed Av, Tv calculating circuit 2 is changeable through addition circuit 6' and subtraction circuit 5' by the output of counter 12" if desired. Signals from circuits 5' and 6' are respectively transmitted to storage circuits 3', 4', and the signal commensurate with the diaphragm aperture from subtraction circuit 5' being transmitted to storage circuit 3' and that commensurate with the exposure time from addition circuit 6' to storage circuit 4'. In the programmed mode, signals through storage circuits 3' and 4' at lines D1 and D4 are transmitted to indicating circuit 10 and exposure control circuit 11 through lines D5 and D6 by way of logical operation circuit 9. In the A mode or S mode, however, contents in storage circuits 3' and 4' are fixed and retained, and level shift circuit 12" is operated by means of the output from OR gate OG1. In other words, in the A mode, the signal commensurate with the exposure time produced from multiplexer 7 and stored in storage circuit 4' is added to the signal from counter 12" by addition and subtraction circuit 13 which performs addition when terminal A' is a "high" level, and subtraction when terminal A' is a "low" level, and this output signal is a signal commensurate with the exposure time value to be preferred for exposure. Furthermore, in the S mode, the signal from counter 12" is subtracted from the signal commensurate with the diaphragm aperture value stored in storage circuit 3' by addition and subtraction circuit 13, and this output signal is a signal commensurate with the diaphragm aperture value to be preferred for exposure. The other components are identical to those in FIG. 1. As is apparent from the above description, the FIG. 6 embodiment is capable of only changing the signals from circuit 2, without fixing them, by means of the level shift circuit 12' in the programmed mode.

Figure 7:
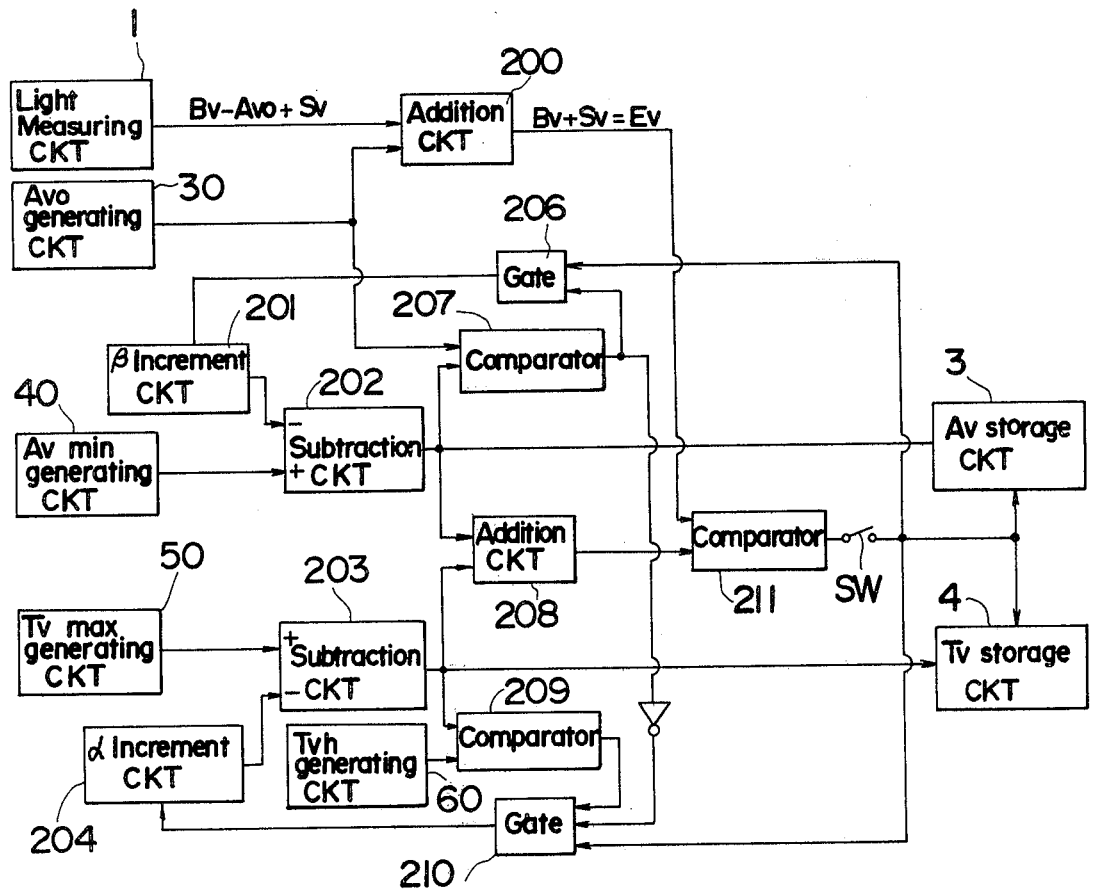
FIG. 7 represents a block diagram showing the details of the block 2 in FIGS. 1 and 6.

FIG. 7 is a block diagram showing an example of the details of programmed Av, Tv calculation circuit 2 as shown in FIGS. 1 and 6. Light measuring circuit 1 produces a signal representative of the amount of incident light passing through a fully open aperture of an objective lens with the film sensitivity added, i.e., $Bv - Av_o + Sv$ signal, wherein Bv represents scene brightness, Avo, the minimum f-number of an objective lens and Sv, film sensitivity, respectively, in accordance with the APEX Notation system, which is used hereinafter. Blocks 30 and 40 are circuits for producing signal Avo of an objective lens and Avm, which represents the maximum f-number, respectively. Avo and Avm are mechanically set at blocks 30 and 40 when the objective lens is mounted on the camera body. Block 50 is a circuit for generating a Tvmax value at the maximum shutter speed, and block 60 is a circuit for generating a Tvh value at the longest shutter speed which would not cause a hand blur. These values depend on camera performance, e.g. Tvmax is set to a value equivalent to 1/1000 second and Tvh equivalent to 1/60 second, respectively. Output $Bv-Avo+Sv$ of light measuring circuit 1 and output Avo of block 30 are added by addition circuit 200 to produce an output of $Ev=Bv+Sv$. In the meantime, subtraction circuit 202 and 203 subtract outputs of $\alpha$ increment and $\beta$ increment circuits 201 and 204 from outputs Avm and Tvmax of blocks 40 and 50, respectively. Thus, $Av'=Avm-\beta$ and $Tv'=Tvmax-\alpha$ are produced from subtraction circuits 202 and 203, respectively, and these two values are added to each other by addition circuit 208 to produce $Av'+Tv'=(Avm-B)+(Tvmax-\alpha)$. This output value and output $Ev=Bv+Sv$ of addition circuit 200 are compared by comparator 211, and while these outputs remain unmatched, a signal is produced from comparator 211 and transmitted through signal gates 206 and 210 to $\beta$ increment and $\alpha$ increment circuits 201 and 204 to successively vary the $\beta$ and $\alpha$ values until the two inputs to comparator 211 match each other. When the two inputs are matched and the output of comparator 211 becomes 0, $Av'=Avm-\beta$ and $Tv'=Tvmax-\alpha$ determined by outputs $\alpha$ and $\beta$ of $\beta$ increment and $\alpha$ increment circuits 201 and 204 are determined as diaphragm aperture Av and exposure time Tv to be stored in storage circuits 3 and 4, respectively. Subtrahends $\alpha$ and $\beta$ are initially set at 0 and are gradually increased while unmatched signals are produced from comparator 211 to change the aperture value Av in the direction from the maximum f-number Avm toward the minimum f-number and also change the shutter speed value Tv toward slower values from the maximum speed value Tvmax so as to match $Av'+Tv'$ to Ev. In this case, $\alpha$ and $\beta$ may be increased simultaneously or may be increased alternately by changing unmatched signals from comparators 211 for alternate transmission to blocks 201 and 204. Additionally, increased rates of $\alpha$ and $\beta$ may be the same value in accordance with the APEX system, or the increased rates for $\alpha$ and $\beta$ may be different from each other, or changed in the course of the increase of $\alpha$ and $\beta$, whereby a wide variety of programs may be achieved. Thus, $\alpha$ and $\beta$ are increased from 0 to vary them to reach a specified value determined by scene brightness, and the time required for this operation can be extremely shortened by using a microcomputer.

When exposure control is carried out by values Av and Tv determined and stored in storage circuits 3 and 4 as described above, programmed exposure control operation is possible. Even if values Av and Tv calculated as described above are beyond the exposure control function, or in the range that would cause a hand blur, the program is so set that it can be handled properly through the functions of gates 206 and 210. Gate 206 is opened by a signal produced by comparator 207, which comprises $Av'=Av-\beta$ with Avo and produces an output signal when $Avo<Av'$, in order to transmit an unmatched signal from comparator 211 to $\beta$ increment circuit 201. However, gate 210 is opened by the inverted signal of the above mentioned comparator 207 or a signal from comparator 209, which compares $Tv'=Tv-\alpha$ with Tvh and produces an output signal when $Tvh<Tv'$, in order to transmit an unmatched signal from comparator 211 to $\alpha$ increment circuit 204. With the above construction, the program is started generally from the maximum f-number and maximum shutter speed, which are gradually shifted toward the smaller exposure value side, and when the shutter speed reaches the limit which would cause a hand blur, gate 210 is closed to fix the shutter speed, and the diaphragm aperture alone is shifted toward the fully open diaphragm aperture, and when reaching the fully opened diaphragm aperture, gate 206 is closed to fix the diaphragm aperture, causing gate 210 to be opened again, whereby the shutter speed is shifted again toward the slower shutter speed side.

Figure 8:
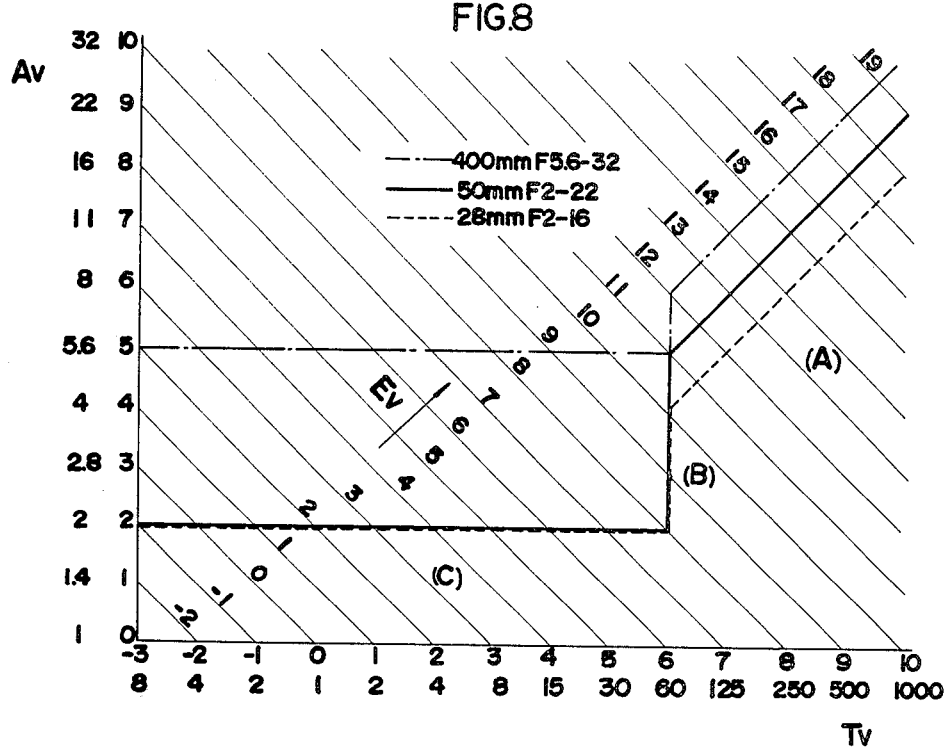
FIG. 8 represents a graph explaining the function of the block diagram in FIG. 7.

FIG. 8 is an example of a program in the embodiment shown in FIG. 7, wherein Tvmax is set at 1/1000 second and Tvh at 1/60 second, respectively. Tv is represented by the abscissa and Av by the ordinate, and the solid lines in FIG. 8 represent a case of attaching a lens of focal length 50 mm, and f-number F2 capable of being stopped-down to f-number F22. The broken lines similarly represent a case with respect to a lens of 28 mm, F2 to F16, and the chained lines represent a case with respect to a lens of 400 mm, F5.6 to F32. Out of the above three objective lenses, a description will be given of one having a focal distance of 50 mm, minimum f-number of F2 and maximum f-number of F22, with the graph being divided into three portions (A), (B) and (C).

In the portion (A) defined by Ev19 to Ev11, for example, where Bv+Sv=13, Av and Tv do not reach Avo and Tvh, and Av and Tv are gradually decreased from Avm=9 (F22) Tvmax=10 (1/1000) to become Av+Tv=Ev=13, the point Av=6 (F8) Tv=7 (1/125) is the output to be determined.

In the portion (B) defined by Ev11 to Ev8, for example, where Bv+Sv=9, Tv reaches Tv=Tvh (1/60), and Av alone is gradually decreased to become Av+Tv=Ev=9, the point Av=3 (F2.8) Tv=6 (1/60) is the output to be determined.

In the portion (C) defined by the range less than Ev=8, for example, where Bv+Sv=2, Av reaches Av=Avo (F2) and Tv alone is gradually decreased to become Av+Tv=Ev=2, the point Av=2 (F2) Tv=0 (1 second) is the output to be determined.

Figure 9:
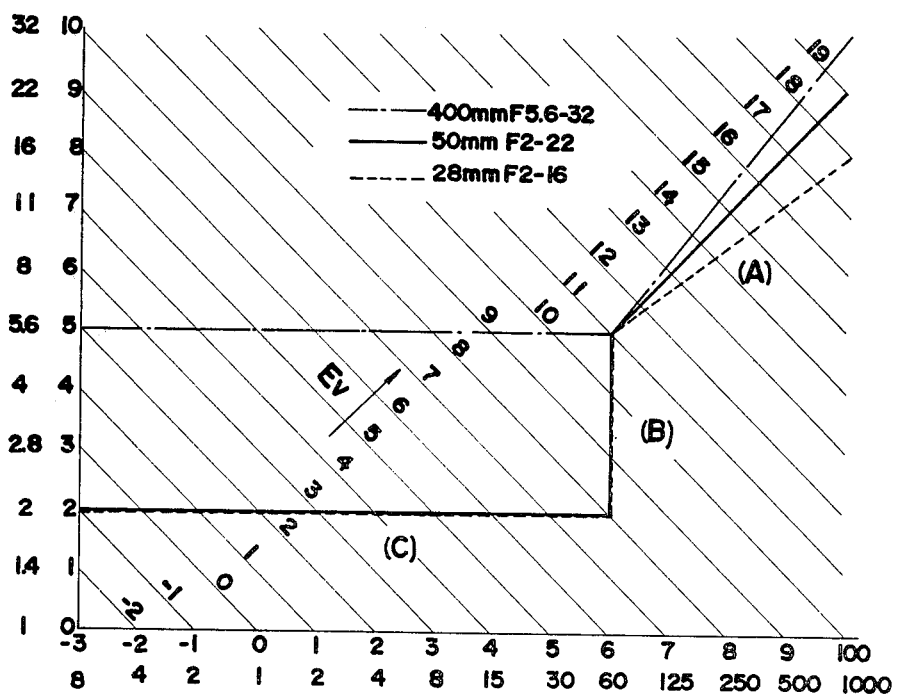
FIG. 9 represents a modification of the function in FIG. 8.

FIG. 9 is a graph illustrating a modification of the program wherein the inclination of the program lines, i.e., solid, broken and chain lines, in portion (A) are different from each other. Generally, there is a correlation in the relationship between the maximum f-number and focal length of an objective lens in that a lens of a greater maximum f-number tends to be of a greater focal length, while a less maximum f-number lens tends to be of a lesser focal length. With this consideration taken into account in FIG. 9, the program is constructed with a greater inclination given to a telephoto lens, i.e. a lens of larger maximum f-number, which is more sensitive to a hand blur, and a smaller inclination given to the wide lens, i.e. a lens of smaller maximum f-number, which is less sensitive to a hand blur. It should be understood that the ratio of the increase of $\alpha$ to that of $\beta$ may be changed to vary the inclination.

In the manner as described above, a photograph without any hand blur is guaranteed in a condition of Ev greater than Ev 8 in case of the solid line in FIG. 8, for example. Additionally, the inclination in portion (A) may be made steeper to eliminate portion (B), so that a shift may be made directly from portion (A) to portion (C), if desired.

Each block in the above embodiments in FIGS. 1, 6 and 7 can be achieved by a well-known analog type circuit. Minimum f-number Avo setting circuit 30 and maximum f-number Avm setting circuit 40 may be realized by a potentiometer which operates when an objective lens is mounted on a camera body. Minimum exposure time TVmax setting circuit 50 may also be a fixed potentiometer, and addition and substraction circuits may be analog addition circuits using operational amplifiers. Further, comparators 207, 210 and 211 may be differential amplifiers, and $\beta$ increment and $\alpha$ increment circuits 201 and 204 may be integrating circuits which integrate a fixed input applied through gates 206 and 210. By making the time constant changeable, the inclination of a program line in the program line diagram may be variable. Counters 12, 12' and 12" in FIG. 1 or 6 may be digital counters whose outputs are D-A converted and applied to substraction circuits 5 and 5' and addition circuits 6 and 6' (not shown).

The device of the FIG. 1 embodiment with FIG. 7 taken into consideration starts operating with the power switch on and in the initial stage of the shutter button depression, switch Sw on the output side of comparator 211 in FIG. 7 is closed to start the operation of the $\alpha$ increment and $\beta$ increment circuits. The operation is instantly completed and Av and Tv transmitted to storage circuits 3 and 4 are indicated. If the shutter button is depressed completely, photography is completed according to the programmed automatic exposure control mode. When an exposure factor to be determined by the program is desired to be changed, the depression of the shutter button is stopped and switch S20 in FIG. 3 is changed from position P to position A or S. Thus, the exposure factor to be determined by the program is stored in storage circuits 3 and 4. In this condition, switch S14, operated by button 14 or a similar switch operated by button 16 in FIG. 2 is operated as desired while watching the indications, and afterwards, the shutter button is depressed again to release the shutter. In this case, aperture-priority or time-priority automatic exposure control is possible. The entire circuitry is reset after one exposure is completed. Alternatively, a manual reset switch may be separately provided.

FIG. 10 shows an improvement of the circuit of FIG. 4. The improvement comprises means for preventing the time value or aperture value from being changed beyond the control faculty of the camera in the case of time-priority or aperture-priority mode. FIG. 10 specifically shows a case, for example, of preventing time value from being changed beyond the maximum shutter speed available in the camera. Comparator 16 compares the output of addition circuit 6 with Tv max generating circuit 50 and closes gate 17 when the output of addition circuit 50 reaches the maximum shutter speed. Thus, the output from one-shot circuit 15 is not transmitted through gate 17 to the "up" terminal of the level shift circuit 12 in FIG. 1 even if switch S14 is further operated. This prevents the time value from being changed beyond the maximum shutter speed and saves a possible error in exposure. Further, the camera operator knows that the change in time value has reached the maximum shutter speed by observing that the indication at indicator 10 is not changed although he further pushes the "up" button 14 in FIG. 2. To prevent the time value from being changed beyond the minimum shutter speed or aperture value beyond the minimum or maximum f-number, a circuit similar to that in FIG. 10 is apparently applicable. Additionally, a warning lamp may be connected to the output of comparator 16 if desired.

In the above embodiment, a digital type circuit may be used for each block. Further, addition and subtraction circuits, comparators and counters may be combined to make an operational circuit which is changed for use in accordance with the respective functions, and the minimum f-number Avo and other information setting and storage circuits may be provided with the respective addresses inside the memory for inputs, whereby the circuit construction may become very compact as a whole. The use of a microcomputer for this type of embodiment is particularly effective.

FIG. 11 is an example of circuit embodied by using a microcomputer for the devices explained in the above drawings. The central processing unit (CPU) 500 comprises carrier flag CY, zero flag ZF, eight bit accumulator ACC, eight bit registers #OR through #13R, and pair-registers #OR through #12PR. Also, there are provided in CPU a logical operation unit, a timing controller, a stack, a stack pointer, a program counter, an instruction register, and an instruction decoder, etc. However, such components are not directly related to the operation of the present embodiment and have been omitted for simplification. ROM 300 is a read-only memory for storing instructions and data. RAM 400 is a random access memory for storing data temporarily and is capable of writing and reading. Also shown in FIG. 11 are output ports OP1, OP2 and OP3 and input ports IP1 and IP2. Also shown in FIG. 11 are camera objective lens 101, diaphragm aperture 102, light receiving element PD, variable voltage source ES for setting film sensitivity and adjusting the output level of the light measuring circuit, diode D for logarithmic compression, operational amplifier OP, D-A converter 100 and analog comparator AC. Circuits 2 and 4 produce the minimum f-number Avo and maximum f-number Avm of an exchangeable lens. Switch 105 is closed when the release button is depressed a first step while switch 106 is closed when the release button is depressed a second step. Switch 107 is closed when film winding is completed and opened when the traveling of the second curtain is completed, while switch 108 is opened in synchronization with the start of the first curtain traveling. Switches 109, 110 and 111 are used to change Av and Tv combinations, as described earlier, and they are the so-called "up", "down" and "reset" switches. Magnet circuit 112 is used for the electromagnet release and magnet circuit 19 is for diaphragm aperture control, both having a permanent magnet core. Magnet circuit 21 is used for the second shutter curtain control.

FIGS. 12-1, 12-2 and 12-3 are flow charts illustrating the circuit operation in FIG. 11. The table I at the end of the present specification shows a list of codes used in the circuitry of FIG. 11, wherein conventional values in accordance with the APEX system are converted to hexadecimal codes with the minimum unit of $\frac{1}{8}$Ev. This means that the upper five bits are integral data and the lower three bits are decimal fraction data for an eight bit numeral. It is to be noted that the hexadecimal codes in Table I are defined so that $Bv + Sv = Tv + Av$ may be achieved and that the values in accordance with the APEX system are hereinafter referred to by using the hexadecimal codes in Table I.

Switch 105 is closed when the release button is depressed one first step, causing a "high" level signal to be applied to reset terminal RE of CPU 500, which is in turn reset to start a program. First at (1), register #8R used as an up-down counter for changing the combination of program EE is set to OOH (wherein H represents that the digit before it is hexadecimal). Then at (2) and (3), the outputs of the minimum f-number avo and maximum f-number Avm for an objective lens from 30 and 40 are applied from input port IP1, and after conversion to the codes in accordance with Table I, Avo and Avm are stored in registers #OR and #4R, respectively. (For example, if the output of 40 is 11B (wherein B represents the digit before it is binary), F32 is converted to Avo=68H and stored in register #4R). At (4), hand blur limit exposure time Tvh=1/60=50H is set into register #1R. At (5), the maximum shutter speed determined by the performance of a camera (hereinafter referred to as Tvmax) which is 1/1000=70H is set into register #5R. At (6), an analog signal commensurate with output Bv−Avo+Sv from the light measuring circuit is converted to a digital signal. The following is a system available for the conversion. FFH is first set into register #2R, and 1 is substracted from the set value and is produced at OP1 to determine if output k of comparator AC for comparing the levels of the light measuring circuit and a D-A converter through D-A converter 100 is at a "high" level. When output k is at a "low" level, 1 is subtracted from the contents of register #2R with this operation being repeated until the output k of comparator AC is inverted, and the contents of register #2R become a digital signal commensurate with Bv+Sv−Avo when inverted. Then at (7), the contents of register #2R are added to those of register #OR to produce BV+Sv=Ev which is set into register #3R. At (9), both Av subtrahend β and Tv subtrahend α commensurate with B increment circuit 201 and α increment circuit 204, respectively, are initial-set into register 00. Then at (10), a check is made whether or not the Ev contents of register #3R, A-D converted at (6) are beyond the exposure control range. In other words, in case Avm+Tvmax<Bv+Sv, exposure control is not possible, and such an indication is made by "over" indication at (11) and the operation is returned to (6) for repeated light measurement. Thus, the shutter release is never effected in case of "over" indication contents. When the contents are within the exposure control range, 01H is added to α and β at (13) and (14). That is, $\frac{1}{8}$EV is added to each of the variables. At (15), α and β are newly subtracted from Tvmax and Avc and the remainders are compared with the contents of register #3R, i.e. Bv+Sv. This is represented by the following equation:

$$Bv+Sv>/<(Tvmax-2)+(Avc-\beta)=Ev \qquad (1)$$

When Bv+Sv matches the right side, or becomes larger than the right side of the equation, Tvmax−α and Avm−β are equal to Tv and Av for correct exposure, and a jump is made from (16) to (28). When the left side is smaller than the right side, the right side is required to be made smaller and α and β are increased by $\frac{1}{8}$, i.e., Ev is decreased by $\frac{1}{4}$Ev, for comparison in equation (1). At (17), the loop is controlled up to the hand blur limit Tv=Tvh. In other words, when (Tvmax−α) Tvh=50H is obtained, the comparison by equation (1) is made below, as shown at (19):

$$Bv+Sv>/<Tvh+(Avm-\beta)=Ev \qquad (2)$$

In equation (2), Tv is Tvh with the diaphragm aperture alone decreased by increasing β and the left side ≧ right side is obtained similar to the loop (15), jumping is possible from (20) to (28). This loop is also controlled by fully open diaphragm aperture at (21), and when Avm −β<Avo is obtained, Av cannot be decreased any more, and the following is achieved for equation (2), as shown at (22) and (23):

$$Bv+Sv>/<(Tvmax-\alpha)+Avo=Ev \qquad (3)$$

In equation (3), the diaphragm aperture is Avo for the fully open aperture, and comparison is made by decreasing Tv. At (25), when Tvmax−α reaches the maximum exposure time Tvmin allowable by the performance of a camera (here equivalent to 8 seconds=08H), "under" indication is made at (26), and a jump must be made back to (6), similarly to the "over" indication, for repeated light measurement, so that no release may be effected. When the left side ≧ right side is obtained either in equations (1), (2) or (3) during these operations, Tvmax−α and Avm −β to be calculated by α and β are Tv and Av values to be determined, and as described earlier, a jump is made to (28). In other words, the program system in FIG. 8 is thus achieved.

(28) through (45) (FIG. 12-2) are used to change the combinations of programmed Av and Tv values according to the desire of a photographer. At (28), (29)

and (30), testing is done as to whether up button 109, down button 111 and reset button 110 are depressed by the photographer, and testing methods are available in several forms, in one of which, for example, eight bit input data from IP2 is masked be deleting AND with an integral data of 04H to test whether e is 1 or 0 by using a zero flag bit of 1 or 0. When either e, g or f is depressed, in this case, the following affects the contents of counter #8R for up or down or reset button only after the button has been detected to be released at (31), (35) and (33):

(I) At up (32), 1Ev (08) H is added to register #8R contents:

$$C+(08)H\rightarrow C$$

(II) At down (36), 1Ev (08) H is subtracted from register #8R contents:

$$C-(08)H\rightarrow C$$

(III) At reset (34), register #8R contents are set to (00) H:

$$(00)H\rightarrow C$$

AT (37) and (38), any variation amount in register #8R is added to the Tv and Av values obtained for exposure up to (27), and the new Av and Tv values are obtained, as follows:

$$Avm-\beta-C=Av \quad (4)$$

$$Tvmax-\alpha+C=Tv \quad (5)$$

The above values are stored in registers #10R and #11R. At (39) through (42), the Av and Tv values obtained from (4) and (5) above are tested to find whether they are beyond the range of Avo<Av<Avm and Tvmin<Tv<Tvmax due to the increase or decrease of C. In case of Tv<Tvmax or Av<Avo, 1Ev is subtracted from Tv and 1Ev is added to Av at (46), (47) and (48), and 1Ev is subtracted from register #8R. Conversely, in case of Tv<Tvmin and Av>Avm, 1Ev is added to Tv and 1Ev is subtracted from Av, and 1Ev is added to register #8R. In the course of the process as described above, final Av and Tv values are set to registers #10R and #11R.

At (49), the Av and Tv values are decoded and transmitted to output port OP3 for indications in the finder. As an indicating method that is available, the DOT indication using LEDs, for example, requires sixteen dots including over and under indications for exposure time, and twelve dots for diaphragm aperture indication. An eight bit output port is used to control the lighting of sixteen LEDs, arranged in a 4×4 LED matrix. Sixteen kinds of data from under to over indications for outputs to the 4×4 matrix are stored in addresses of ROM 300 starting at K+0 to K+15, and integral parts alone are taken out of the TV data stored in register #11R and are shifted right by 3 bits to add this numeral to K+0. The added numeral indicates the address, the contents of which are output data to the output port for indication of a shutter speed to be determined. In the above method, decimal points are ignored, however, in case of decimal parts from (010)B to (101)B, two LEDs are set to be lit, and the output data to the 4×4 matrix for two LED indications are stored in ROM 300 in a similar manner as described above. Both decimal point and integral data are taken up and decoded, thereby making it easy to light up two LEDs for indication.

At (70), the operation for A mode or S mode is subsequently carried out, the details of which will be described later in accordance with FIG. 12-3. At (50) and (51), switch 106 having been closed in the second step of the release button depression and switch 107 having been closed upon completion of film winding are checked to find whether both are closed. If any one of the switches is not closed, a jump is made back to (5) for repeated light measurement even when the step is moved to (60).

When both switches are closed at (b=c=1), h is at a "high" level to operate release magnet circuit 112 at (52) for release operation. Then at (53), the contents of register #11R are set to ACC, and when this value is produced at output port OP1, an analog signal commensurate with Tv, i.e. Bv+Sv−Av, is produced from D-A converter 100. When the diaphragm aperture starts its stopped-down operation, an analog signal commensurate with Bv+Sv−Avo is produced from a light measuring circuit with (Bv+Sv−Avo)>(Bv+Sv−Av) obtained, whereby the output of comparator Ac is at a "high" level. With the diaphragm aperture stopped-down operation started, the output level of the light measuring circuit gradually declines, and when diaphragm 102 is stopped-down to a predetermined value Av, output k of comparator AC is inverted. This input signal causes terminal i to be at a "high" level at (55) to operate magnet circuit 19 for diaphragm aperture control, whereby the diaphragm aperture stopped-down operation is stopped to determine the diaphragm aperture.

At (55), terminal j is also at a "high" level to operate magnet circuit 21 for the second shutter curtain control, thus turning on the magnet for restraining the second curtain. For power conservation, it is desirable that power connection to the second curtain restraining magnet be timed.

The reflecting mirror is elevated through a well-known mechanical operation, and after mirror elevation, the first curtain starts traveling, in synchronization with which switch 108 is opened to start the counting of exposure time. The counting continues for a period of time commensurate with the count in register #11R. The following is available as a counting method. The following data commensurate with the upper five bits of integral data out of Tv data stored in register #10R are stored in ROM 300 in fourteen sets from 1/1000 to eight seconds with two addresses set as a set. For example, if Tv is (70) H=(01110000) B, $2^1$=(00000000) (00000001) commensurate with (01110) B, and if Tv is between (6F) H=(01101111) B and (68) H=(01101000), $2^2$=(00000000) (00000010) commensurate with (01101) B. Similarly, $2^3$=(00000000) (00000100) . . . $2^{14}$=(00100000) (00000000), in this way, sixteen bit data is considered, one bit being shifted to the left as the integral data of Tv increases by one.

Concerning decimal point data, ⅛Ev commensurate with three bits (000) B to (111) B, i.e. equally proportional numeral row of every $2^{\frac{1}{8}}$ time (Ao, $2^{\frac{1}{8}}$.Ao, $2^{2/8}$.Ao, . . . $2^{7/8}$.Ao=A) is considered. As an example of storing A in ROM 300, the following are considered, i.e. 64 or (40) H for (000) B, 59 or (3A) H for (001) B, 54 or (35) H for (010) B . . . 35 or (23) H for (111).

When Tv data is given to make the above preparation possible, the sixteen bit data $2^n$ commensurate with the upper five bits of integral parts are taken out of ROM 300 for transfer to the registers of CPU, and eight bit data A commensurate with the decimal point is also taken out of ROM 300 for repeated counting of $2^n$ A times in synchronization with the count switch.

That is, assuming that the counting time is T, time t for completing counts is $t=A.2^n.T$. For example, assuming $T=1/128$ ms and Tv data (61) H=(01100001) B, the sixteen bit data is (00000000) (00000100) from integral data (01100) B, i.e. $2^3$, A=59 is obtained from decimal point data (001) B, thus becoming $t=1/128. 2^3. 59=3.69$ ms, which is the exposure time by $\frac{1}{8}$ Ev shorter than (60) H, i.e. 1/125. In other words, counting the time of double system A times at $\frac{1}{8}$ Ev intervals makes logarithmic compounding possible.

When exposure time counting is completed, terminal j is at a "low" level to start the second curtain traveling. When the second curtain traveling is completed, switch 107 is opened and C is at a "low" level, one computing process is terminated, and a jump is made to (5) for preparation for the next photograph.

With the above construction, an exposure control device is achieved in which the programmed exposure system minimizes photography failure according to a wide variety of photographic conditions. Also, combinations of exposure time and diaphragm aperture values can be simply changed by easy operation with the depth of field and blurless exposure time taken into consideration by the photographer.

Figures 1, 12:
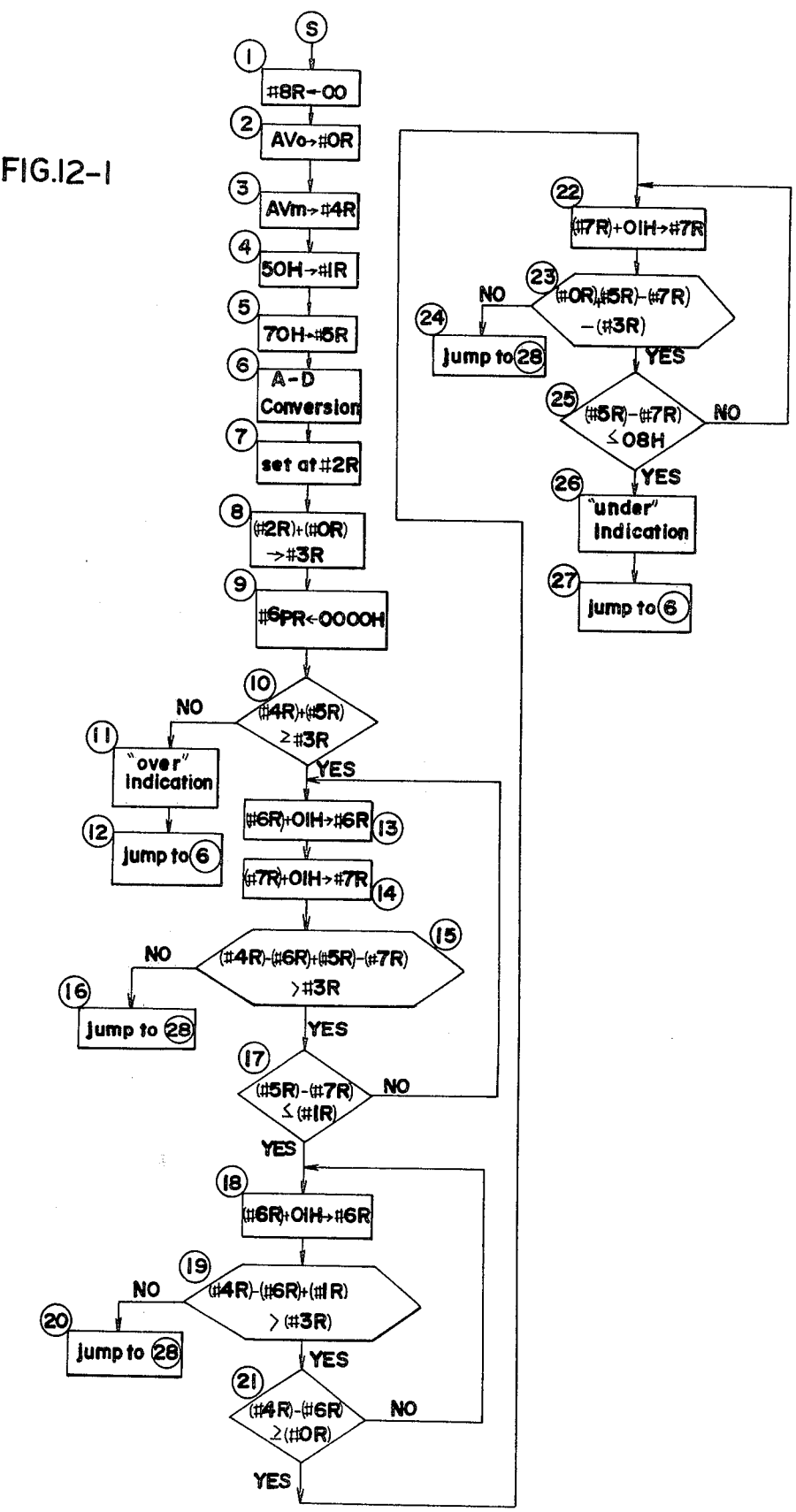
Figures 3, 12:
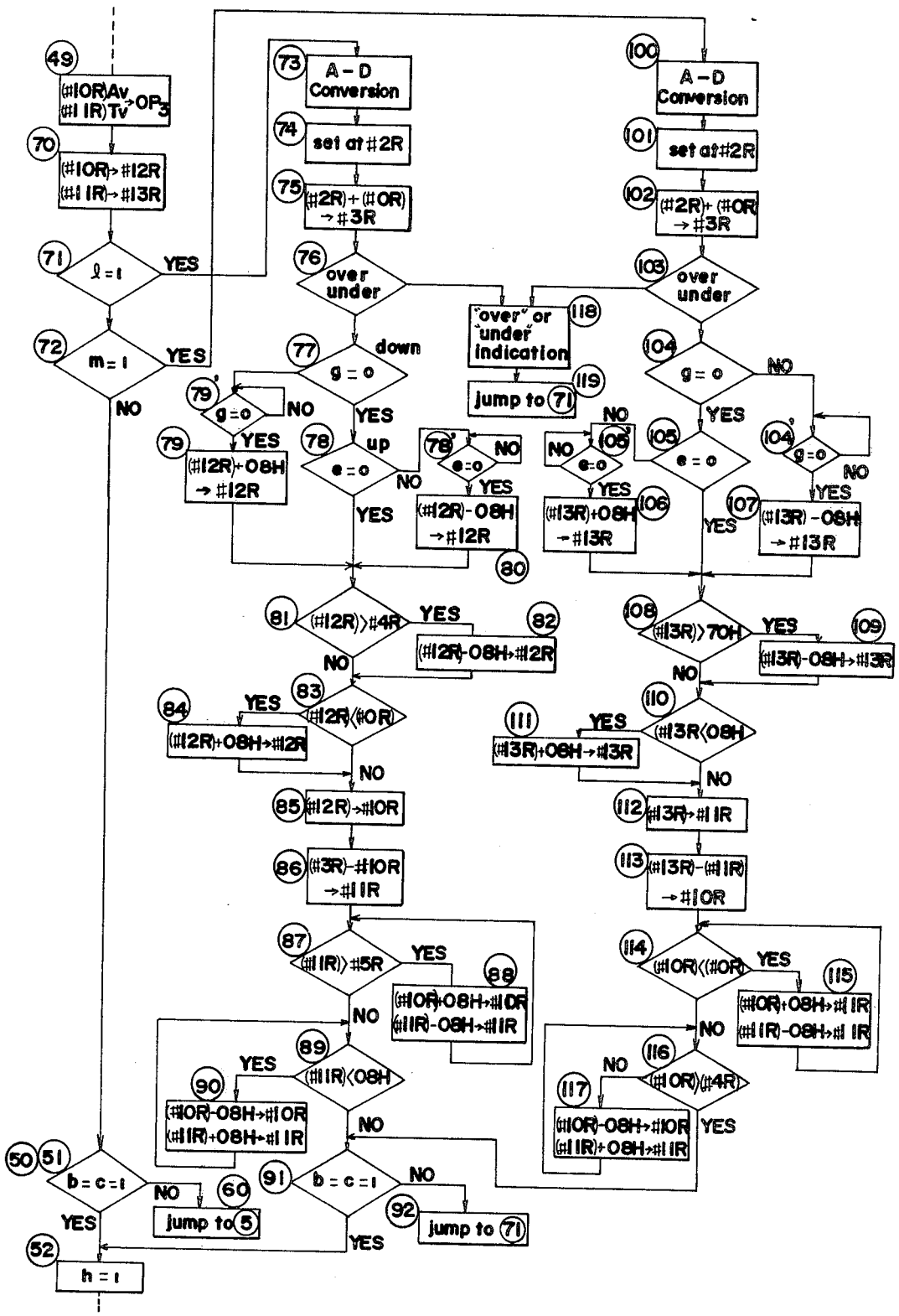

The following description in cooperation with FIG. 12-3 relates to the exposure controls in the S and A modes.

The S mode operation is as follows. Through the steps up to (49), the above mentioned programmed Av and Tv are stored in registers #10R and #11R, respectively. At (71), the Av and Tv values are stored in registers #12R and #13R. Assuming that b=1, i.e. mode changeover switch S20 is set to the S position at (71), and the procedure jumps to (73), where the shutter speed to be preferred for Av stored in register #12R is determined in the following steps. At (73) and (74), Bv+Sv−Avo is A−D converted in the same manner described above, and at (75), Avo is added to the converted value to store Bv+Sv in register #3R. At (76), the calculated Bv+Sv is checked if it is inserted between Tvmax+Avm and Tvmin+Avo, and if not, over or under indication is made at (118), and a jump is made to (71) for mode check and repeated light measurement. When Bv+Sv is within the control range, up button 109 and down button 111 are checked to determine if they are depressed respectively at (77) and (78), i.e. whether or not there is assignment of an Av value to be preferred for exposure. When down button 111 is depressed, the Av value to be preferred for exposure to which 1Ev (08) H is added in register #12R is stored therein. When up button 109 is depressed, the Av value from which 1Ev (08) H is subtracted is similarly stored in register #12R. At (81) through (84), the Av value to be preferred for exposure, increased or decreased at (79) and (80), is checked to find if it is beyond Avo and Avm, and if it is, 1Ev is increased or decreased from Av value once again so that it stays within the range of Avo≦Av≦Avm.

At (85), the Av value to be preferred for exposure is transferred to register #10R and at (86), Bv+Sv−Av is calculated to determine Tv. At (87) through (90), the determined Tv value is checked to find whether it stays within Tvmax and Tvmin, and if it exceeds either value, exposure control with any desired Av value to be preferred is impossible, and Av and Tv are shifted by 1Ev.

At (91), b=c=1. i.e. whether or not the release button is depressed in the second step upon completion of film winding is checked, and if so, a jump to (52) is possible for release operation and exposure control is made according to the contents of registers #10R and #11R. If not, a jump to (71) is made for repeated operations as described above.

As is apparent from the above description, diaphragm aperture priority exposure control is achieved, and the photographer may only have to select any desired diaphragm aperture value by pushing up button 109 or down button 111 at desired time. Further, the aperture value is prevented from being changed beyond the control faculty of the camera.

The processing in the A mode is identical to that of the S mode, and description thereof is therefore omitted. In both the A and S modes, it may be desired that a value to be preferred for exposure is fixed for a number of photographs after it has once been selected. For this purpose, CPU 500, ROM 300 and RAM 400 are always supplied with power so that the priority values are stored therein, with the power to indicating circuit 10 and light measuring circuits OP and AC being applied by the first step of the release button operation. AND outputs m, b and a are connected to reset terminal RE so that the reset terminal of the CPU remains off in either the A or S mode. Furthermore, with switch 106 closed by the second step of the release button operation, the above circuit, electromagnetic release circuit 112, diaphragm aperture control circuit 19 and second curtain control circuit 21 are supplied with power, thereby reducing power consumption.

Power retention is released when switch 107, in association with film winding, is closed after the traveling of the second curtain has been completed. In the above construction, light measurement is performed by the first step of the release button operation, and after the release button has been released by the second step of the release button operation, the power is maintained even if the release button is freed from the operator's finger before exposure control is completed. Also, when the release button remains depressed after exposure control has been completed, and film winding has not been completed, a jump from (51) in FIG. 12-2 to (5) in FIG. 12-1 is made for repeating light measurement for the next photograph.

Another system may include elements with low power consumption, such as the use of CMOS components for the CPU, RAM and ROM units, to which power can be supplied at all times.

As described above, a program system according to the present invention is achieved which minimizes failure in accordance with a variety of photographic conditions, and at the same time, allows the desires of a photographer to be incorporated with simple operations. Also, in addition to the program system, exposure time priority diaphragm aperture EE and diaphragm priority shutter EE functions are available. Although the above embodiments using an eight bit micro-computer have been described, a micro-computer using four bits is possible without any change in fundamental construction, and when the registers are a few in number inside the CPU as shown in FIG. 5, registers inside the RAM unit can be used for almost identical functions to the use of registers in the CPU.

TABLE 1

| Hexadecimal Code | Scene Brightness $B_v$ | Film Speed ASA | Film Speed $S_v$ | Aperture Value $F_{No.}$ | Aperture Value $A_v$ | Exposure Time Shutter Speed | Exposure Time $T_v$ |
|---|---|---|---|---|---|---|---|
| 98H | 13 | | | | | | |
| 90H | 12 | | | | | | |
| 88H | 11 | | | | | | |
| 80H | 10 | | | | | | |
| 78H | 9 | | | | | | |
| 70H | 8 | | | | | 1/1000 | 10 |
| 68H | 7 | | | 32 | 10 | 1/500 | 9 |
| 60H | 6 | 6400 | 11 | 22 | 9 | 1/250 | 8 |
| 58H | 5 | 3200 | 10 | 16 | 8 | 1/125 | 7 |
| 50H | 4 | 1600 | 9 | 11 | 7 | 1/60 | 6 |
| 48H | 3 | 800 | 8 | 8 | 6 | 1/30 | 5 |
| 40H | 2 | 400 | 7 | 5.6 | 5 | 1/15 | 4 |
| 38H | 1 | 200 | 6 | 4 | 4 | 1/8 | 3 |
| 30H | 0 | 100 | 5 | 2.8 | 3 | 1/4 | 2 |
| 28H | −1 | 50 | 4 | 2 | 2 | 1/2 | 1 |
| 20H | −2 | 25 | 3 | 1.4 | 1 | 1 | 0 |
| 18H | −3 | 12 | 2 | | | 2 | −1 |
| 10H | −4 | | | | | 4 | −2 |
| 08H | −5 | | | | | 8 | −3 |

What is claimed is:

1. Exposure control system for a camera capable of aperture or shutter priority exposure mode operation comprising:
    means for measuring light intensity to produce a first signal including information of the light measurement;
    means for producing at least a second signal indicative of either the aperture value or the time value according to said first signal in a programmed relationship;
    means for storing said second signal prior to actual photography to retain said second signal as the priority data with a subsequent change of said first signal;
    first means for determining either the aperture size or the exposure time in accordance with said first signal influenced by the subsequent change and said stored second signal; and
    second means for determining the other of the aperture size or the exposure time commensurate with said either the aperture size or the exposure time, whereby the priority data is automatically obtainable by means of the light measurement prior to actual photography.

2. Exposure control system as in claim 1, wherein said second determining means is adapted to determine said other of the aperture size or the exposure time in accordance with said stored second signal.

3. Exposure control system as in claim 1, wherein said producing means is adapted to further produce a third signal indicative of the other of the aperture value or the time value according to said first signal in a programmed relationship, said first determining means is further capable of determining said one of the aperture size or the exposure time in accordance with one of said second or third signals, and said second determining means is further capable of determining said other of the aperture size or the exposure time in accordance with the other of said second or third signals.

4. Exposure control system as in claim 1 further comprising means for calculating said first signal with said stored second signal to form a fourth signal, wherein said first determining means is responsive to said fourth signal.

5. Exposure control system as in claim 4, further comprising means for indicating said fourth signal and said stored second signal.

6. Exposure control system as in claim 1 further comprising means for optionally changing said second signal by a desired value.

7. Exposure control system as in claim 6, wherein said changing means is disposed to change the second signal before storage by said storing means.

8. Exposure control system as in claim 6, wherein said changing means is disposed to change said second signal after storage by said storing means.

9. Exposure control system for a camera comprising:
    means for measuring light intensity to produce a first signal including information of the light measurement;
    means for producing a second signal indicative of the aperture value and a third signal indicative of time value according to said first signal in a programmed relationship;
    means for controlling the aperture size and the exposure time in accordance with said second and third signals, respectively;
    first means for optionally changing one of said second or third signals by a desired value; and
    second means, in cooperation with said first changing means, for changing the other of said second or third signals commensurately with the change in said one of said second or third signals.

10. Exposure control system as in claim 9 further comprising means for storing at least one of said second or third signals, and means for calculating said first signal with said stored one of said second or third signals to form a fourth signal, wherein said controlling means is further capable of controlling one of the aperture size or exposure time in accordance with said fourth signal, and the other of the aperture size or exposure time in accordance with said stored one of said second or third signals.

11. Exposure control system as in claim 10, wherein said at least one of said second or third signals is stored by said storing means before being changed by said first and second changing means, and said calculating means calculates said first signal with said stored one of said second or third signals after being changed by said first and second changing means.

12. Exposure control system as in claim 10, wherein said at least one of said second or third signals is stored by said storing means after being changed by said first and second changing means, and wherein said exposure control system further comprises a third changing means for changing ing the stored one of said second or third signals by a desired value, in which said calculating means calculates said first signal with said stored one of said second or third signals after being changed by said third changing means.

13. Exposure control system as in claim 10, further comprising an indicating means responsive to said second, third and fourth signals.

14. Exposure control system as in claim 9 further comprising manually operable means for controlling said first and second changing means to determine said desired value by which said one of said second or third signals is changed.

15. Exposure control system as in claim 9, wherein said producing means includes means for providing an initial aperture value signal and an initial time value signal, first means for successively shifting said initial aperture value signal to form said second signal, second means for successively shifting said initial time value signal to form said third signal, means for controlling said first and second shifting means according to the sum of said second and third signals in a programmed manner, and means for stopping the successive shifting operation of said first and second shifting means when the sum of said second and third signals is in a predetermined relationship with said first signal, whereby said second and third signals are determined in accordance with said first signal.

16. Exposure control system for a camera comprising:
   means for measuring light intensity to produce a first signal including information of the light measurement;
   means for producing a second signal indicative of the aperture value and a third signal indicative of the time value according to said first signal in a programmed relationship; and
   means for controlling the aperture size and the exposure time in accordance with the second and third signals, respectively, wherein said producing means includes means for providing an initial aperture value signal and an initial time value signal, first means for successively shifting said initial aperture value signal to form said second signal, second means for successively shifting said initial time value signal to form said third signal, means for controlling said first and second shifting means according to the sum of said second and third signals in a programmed manner, and means for stopping the successive shifting operation of said first and second shifting means when the sum of said second and third signals is in a predetermined relationship with said first signal, whereby said second and third signals are determined in accordance with said first signal.

17. Exposure control system for a camera capable of aperture or shutter priority exposure mode and programmed exposure mode operation comprising:
   means for measuring light intensity to produce a first signal including information of the light measurement;
   means for producing a second signal indicative of the aperture value and a third signal indicative of the time value according to said first signal in a programmed relationship;
   means for controlling the aperture size and the exposure time in accordance with the second and third signals, respectively, upon actual photography in the programmed exposure mode;
   means operative in the aperture or exposure time priority mode for storing at least one of said second or third signals prior to actual photography to retain said second or third signal as the priority data with a subsequent change of said first signal; and
   means for calculating said first signal influenced by the subsequent change with said stored one of said second or third signals to form a fourth signal, wherein said controlling means is further capable of controlling either the aperture size or the exposure time in accordance with said fourth signal, and the other of the aperture size and the exposure time in accordance with said stored one of the second or third signals in the aperture or exposure time priority mode, whereby the priority data is automatically obtainable by means of the light measurement prior to actual photography.

18. Exposure control system as in claim 17, wherein at least said producing means, storing means and calculating means are a micro-computer.

* * * * *